United States Patent [19]

Schmeer et al.

[11] Patent Number: 4,536,441
[45] Date of Patent: Aug. 20, 1985

[54] ADHESIVE TAPE

[75] Inventors: Gert Schmeer, Bergen; Eberhard Engelmann; Karl Schäfer, both of Hamburg, all of Fed. Rep. of Germany

[73] Assignee: Beiersdorf Aktiengesellschaft, Hamburg, Fed. Rep. of Germany

[21] Appl. No.: 618,990

[22] Filed: Jun. 11, 1984

[30] Foreign Application Priority Data

Jun. 25, 1983 [DE] Fed. Rep. of Germany ....... 3323018

[51] Int. Cl.³ .............................. B32B 7/12; C09J 7/02
[52] U.S. Cl. .................................. 428/317.3; 428/343; 428/347; 428/352; 428/910
[58] Field of Search .................. 428/40, 317.1, 317.3, 428/317.7, 319.7, 906, 910; 427/173, 343, 346, 347, 352

[56] References Cited

U.S. PATENT DOCUMENTS

| 3,241,662 | 3/1966 | Robinson et al. | 428/910 |
| 3,995,087 | 11/1976 | Desanzo | 428/40 |
| 4,137,362 | 1/1979 | Miki et al. | 428/910 |
| 4,188,442 | 2/1980 | Asakura et al. | 428/40 |
| 4,275,120 | 6/1981 | Weiner | 428/516 |
| 4,333,968 | 6/1982 | Nahmias | 428/349 |
| 4,451,533 | 5/1984 | Wong et al. | 428/343 |

FOREIGN PATENT DOCUMENTS

| 38108 | 10/1981 | European Pat. Off. . |
| 40480 | 11/1981 | European Pat. Off. . |
| 1628637 | 3/1972 | Fed. Rep. of Germany . |
| 2061418 | 6/1972 | Fed. Rep. of Germany . |
| 2440286 | 3/1976 | Fed. Rep. of Germany . |
| 2927633 | 1/1980 | Fed. Rep. of Germany . |
| 2242450 | 8/1974 | France . |
| 2409858 | 11/1977 | France . |
| 1569112 | 6/1980 | United Kingdom . |
| 2097403 | 11/1982 | United Kingdom . |

OTHER PUBLICATIONS

Chemical Abstracts, vol. 84, 1971, p. 54, Abstract No. 136736m, Keisuke S., "Polypropylene Foam Tapes".
Encyclopedia of Polymer Science and Technology, vol. 7, John Wiley & Sons, Inc., N.Y., 1967, pp. 581, 582.
Kunststoff-Lexikon, Carl Hanser, Munich, 1981, pp. 9–13.

Primary Examiner—William J. Van Balen
Attorney, Agent, or Firm—Sprung Horn Kramer & Woods

[57] ABSTRACT

The invention relates to an adhesive tape having a base material which is stretched more highly at right angles to the web direction than in the web direction, contains polypropylene as the main component, and is provided with at least one pressure-sensitive or heat-sealable adhesive layer, characterized in that the base material is foamed and that the stretch ratio in the web direction is 1:1 to 1:4 and at right angles to the web direction is 1:3 to 1:8, the stretch ratio at right angles to the web direction being greater than the stretch ratio in the web direction.

12 Claims, 1 Drawing Figure

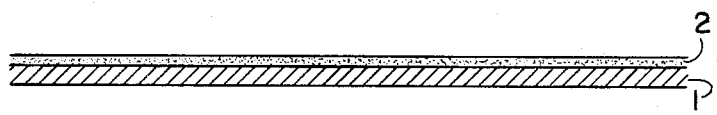

ADHESIVE TAPE

The invention relates to an adhesive tape having a stretched base material containing polypropylene as the main component.

Pressure-sensitive adhesive tapes with biaxially stretched polyolefine film bases, which are stretched more highly in the transverse direction than in the lengthwise direction, have already been disclosed in German Patent Specification 2,440,286. In these, the stretch ratio in the transverse direction can be several times greater than the stretch ratio in the lengthwise direction. Such films are supposed to be easily manually tearable in the transverse direction. The density of the films is greater than 0.9 g/cm$_3$. These adhesive tapes are moreover supposed to be distinguished by special strength properties, which are necessary for the manufacture and use of such tapes. Thus, the base film is supposed to have a tensile strength, in the lengthwise direction, of more than 170 kg/cm$^2$, a tearing strength, in the transverse direction, of more than 800 kg/cm$^2$, and an elongation at break, in the lengthwise direction, of more than 200%. According to German Patent Specification 2,440,286, films having an elongation at break in the lengthwise direction of less than 200% can no longer be unreeled from the roll of adhesive tape, because the tape breaks during such unreeling.

It has been found that these adhesive tapes do not always have satisfactory properties in practice. Thus, it is difficult to start a tear manually in the transverse direction, since the strength and elongation are too great.

It is the object of the invention to provide adhesive tapes, having a base material, which can be torn in a straight-edged manner at right angles to the web direction, in the same way as paper or even without aids, but in which a tear cannot be started manually in the web direction, or is at least more difficult to start than at right angles to the web direction. The tapes are intended to have a tensile strength, at right angles to the web direction, which is greater than the strength of impregnated papers, while in the web direction they are intended still to have adequate strength and tensile impact strength to allow them to be wound up, and unwound, by mechanical means. Similar remarks apply to the base material.

Moreover, the base material is intended to have a paper-like handle and a rigidity which matches the rigidity of paper and is greater than that of films. The base material is intended to have a lower price than paper, and to be insensitive to moisture.

The base material is intended to be capable of being coated full-width, or only partially in strips running in the web direction, with pressure-sensitive or heat-sealable adhesive and to be capable of being coated correspondingly with a release lacquer on the rear face. The coated base material, wound into rolls of use width, is intended during unwinding to have taken from it, by cutting or punching at right angles to the web direction, strips or cut portions which are capable of withstanding a load in the direction of the base material which originally was at right angles to the web direction, and these strips or cut portions are intended to be usable as, for example, an adherable carrier handle, an adherable fixing strip of a diaper pant closure or as an adherable fixing strip of other closing systems. The orientation of the adhesive strips according to the invention is intended, upon mechanical dispensing of the strip, to permit decreasing the cycle times, since the distance of advance need only correspond to the transverse dimension of the strip.

A further possible use of the adhesive tapes according to the invention is intended to exist in cases where a straight-edged, clean severing of the adhesive tape material is required manually, without using any aids (such as a knife edge, toothed edge or perforations). This requirement applies, for example, in the case of socalled garment rolls or fluff pick-up rolls, which requirement is only met incompletely by the fluff pick-up rolls with paper base material, usually employed.

Uncoated base material is intended to be usable as packaging material or insulating material. Base material provided only with a release coating is intended to be usable as a covering film or release film for tacky products.

This object is achieved by an adhesive tape having a base material which is stretched more highly at right angles to the web direction than in the web direction, contains polypropylene as the main component, and is provided with at least one pressure-sensitive or heat-sealable adhesive layer, characterised in that the base material is foamed and that the stretch ratio in the web direction is 1:1 to 1:4 and at right angles to the web direction is 1:3 to 1:8, the stretch ratio at right angles to the web direction being greater than the stretch ratio in the web direction.

The stretch ratio indicates by what multiple the original length or width of the base has been lengthened or widened by the stretching process. Alternatives for the expression "web direction" are also known, for example lengthwise direction or machine running direction. By the term "at right angles to the web direction", also referred to as the transverse direction, there is meant the direction at right angles in the plane of the web.

The stretch ratios in the web direction and at right angles to the web direction are of great importance in the foamed adhesive tape base materials according to the invention. Preferably, the stretch ratio in the web direction is at least 1:1.1, especially 1:2–3. Preferred stretch ratios at right angles to the web direction are 1:4–6. Particularly preferred base materials are stretched about 2 to 3 times as much at right angles to the web direction as in the web direction, especially for use in adhesive tapes. Base materials which are unstretched in the web direction are also a subject of the invention.

For certain applications, stretch ratios, in the web direction or at right angles to the web direction, which are balanced with one another in a particular manner, are preferred. Thus, for carrier handle reinforcements and fixing strips of diaper pant closures, low stretch ratios in the web direction and high stretch ratios at right angles to the web direction are particularly advantageous.

On the other hand, a higher stretch ratio in the web direction is advantageous for a covering material bearing a release coating.

The polypropylene used according to the invention is isotactic polypropylene or polypropylene having a high isotactic content, especially in excess of 70%. The polypropylene content can be up to 98%.

Further, polypropylene copolymers can be employed. Random copolymers or block copolymers may be used. Copolymers of propylene and olefines are preferred, the olefine content preferably being up to 20%.

The use of propylene/ethylene copolymers which contain up to 20% of copolymerised ethylene is particularly preferred.

Further, mixtures of polypropylene with the polypropylene copolymers, especially with the copolymers of propylene and ethylene, may be used. Mixtures of polypropylene and/or polypropylene copolymers with polyethylene, preferably high pressure polyethylene, are especially suitable. The proportion of polyethylene can be up to 30%. Instead of polyethylene, EPM, EPDM or polyisobutylene or mixtures of these polymers, also mixed with polyethylene, can be employed. Preferably, the proportion of polyethylene, EPM, EPDM or polyisobutylene, or of mixtures of these, is 2-30%, especially 5-10%.

Preferably, other polymers or polymer mixtures, hereafter referred to as a toughening additive, may be added to the said polymers or polymer mixtures. Accordingly, the invention relates both to bases containing these polymers and to bases without this additive. Preferably, the proportion is 1-25%, based on the total polymer constituent. The addition of an ethylene/vinyl acetate copolymer (EVA), especially up to a proportion of 15%, is particularly preferred. Further, the addition of butadiene/styrene block copolymers (SBR) or similar additives which increase the impact strength, such as thermoplastic rubbers, especially SIR, and copolymers of these polymers and mixtures of these, including mixtures with butadiene/styrene block copolymers, is preferred, especially up to a proportion by weight of 20%.

A combination of the ethylene/vinyl acetate copolymers with the butadiene/styrene block copolymers and/or the toughening additives mentioned is particularly preferred. The proportion by weight of this combination is preferably up to 25% of the total mixture.

In processing polypropylene and raw material mixtures which consist to more than 95% of polypropylene, the preferred stretch ratios are those where the product of the stretch ratio in the web direction multiplied by the stretch ratio at right angles to the web direction is not more than about 9, the stretch ratio in the web direction advantageously being only slightly less than the stretch ratio at right angles to the web direction, for example a stretch ratio of 1:2.5 in the web direction and of 1:3 at right angles to the web direction.

In processing copolymers with ethylene or other olefines, or processing mixtures which contain less than 95% of polypropylene, stretch ratios where the product of the stretch ratio in the web direction multiplied by the stretch ratio at right angles to the web direction is greater than about 9 are preferred. Using toughened mixtures it is possible to achieve stretch ratios for which the product of the stretch ratio in the web direction multiplied by the stretch ratio at right angles to the web direction is greater than about 12 to about 20. The more the toughening additive is replaced by other constituents of the mixture, the more the product of the stretch ratios preferably assumes a somewhat lower value.

Advantageously, fixing strips for diaper pant closures and carrier handles employ a base containing a toughening additive.

A blowing agent, which on heating releases gases due to decomposition is added to the polymer suitable for the manufacture of the bases according to the invention. Compounds or systems which are solid under normal conditions are especially suitable. Particularly preferred blowing agents are those based on citric acid/sodium bicarbonate, commercially available under, for example, the name Hydrocerol, and azodicarboxamide. Further suitable blowing agents are $\beta$-naphthalenesulphonic acid hydrazide, diphenylsulphone-3,3'-disulphonylhydrazide, benzene-1,3-disulphonic acid hydrazide, benzenesulphonic acid N-phenylhydrazide, sodium bicarbonate/melamine, p,p'-oxybis-benzenesulphonylhydrazide, sodium carbonate/citric acid, urea/biuret, 1,6-di-n-decyl-azobis-formamide and diphenyl-4,4'-di-(sulphonylazide).

The proportion by weight of blowing agent in the mixture is preferably 0.5 to 4%, more especially 1 to 3%.

The density of the foamed bases is especially 0.4 to 0.75 g/cm$^3$, preferably 0.45 to 0.65 g/cm$^3$.

The thickness of the foamed, unstretched bases can be about 0.075 to 10 mm, especially 0.25 to 2.5 mm, and must be matched to the chosen stretch ratios. Depending on the intended use, the foamed and stretched bases may in particular have a thickness of 25 to 500 $\mu$m.

The bases according to the invention are uniformly stretched and of constant thickness. They are uniformly permeated by closed pores which are up to 30 $\mu$m deep and are oriented in conformity with the stretch ratios. The surface is continuous and slightly grained or finely structured.

The bases according to the invention can be obtained analogously to conventional processes. The foamable mixture of polymers and blowing agent is introduced into an extruder, heated therein, extruded as a web and foamed. The foamed web is stretched, by known methods, in the stretch ratios indicated in claim 1. Preferably, stretching is carried out on a stenter frame. In this method, it is usual to stretch the material in the web direction and thereafter at right angles to the web direction. However, it is also possible to stretch it first at right angles to the web direction and then in the web direction.

Adhesive tapes can be produced from the bases thus obtained by applying a pressure-sensitive or heat-sealable adhesive composition, known per se, to one or both faces. The rear face of the adhesive tape is preferably also provided with a non-stick layer, for example if an adhesive tape coated with pressure-sensitive adhesive composition is to be wound up into rolls. To improve the anchoring of the coatings, the surface of the base films can be pretreated by methods such as are conventionally employed for polyolefine film surfaces. Adhesion-promoting layers can also be applied.

In addition to the properties set out in the statement of objects, the adhesive tapes according to the invention preferably also possess the following characteristics:

(1) The tensile strength in the web direction is more than 5 N/mm$^2$, preferably more than 8 N/mm$^2$.

(2) The tensile strength at right angles to the web direction is more than 20 N/mm$^2$, preferably more than 25 N/mm$^2$.

(3) The elongation at break in the web direction is less than 100%, preferably less than 60%.

(4) The elongation at break at right angles to the web direction is less than 80%, preferably less than 40%.

The measured values 1 to 4 are determined by the tension/elongation test according to DIN 53,455 at 300 mm/min test speed.

(5) The tensile impact strength in the web direction is more than 30 mJ/mm$^2$, preferably more than 50 mJ/mm$^2$.

(6) The tensile impact strength at right angles to the web direction is more than 60 mJ/mm$^2$, preferably more than 100 mJ/mm$^2$.

The measured values 5 and 6 are determined by the tensile impact test according to DIN 53,448, but on 15 mm wide test strips.

(7) The tear propagation resistance, with the tear running in the web direction, is more than 20 N/mm, preferably more than 30 N/mm.

(8) The tear propagation resistance with the tear running at right angles to the web direction is less than 30 N/mm, preferably less than 20 N/mm.

The measured values 7 and 8 are determined according to DIN 53,363.

(9) The tear-starting resistance of an adhesive tape having a 100 μm thick base material is less than 12 N, preferably less thah 8 N, at a cut edge in the web direction.

(10) The tear-starting resistance of an adhesive tape having a 100 μm thick base material is more than 12 N, preferably more than 15 N, at a cut edge at right angles to the web direction.

The measured values 9 and 10 were determined using the so-called "MPA" apparatus (tear-starting apparatus of the Berlin-Dahlem Materials Testing Institute).

(11) In the Schlenker bending test on a 19 mm wide sample and using a 30% bending angle, an adhesive tape having a 100 μm thick base material requires, for curvature at right angles to the web direction, a bending moment of more than 1 cN cm, preferably of more than 3 cN cm.

(12) In a bending test as under 11), but with curvature in the web direction, a bending moment of more than 0.5 cN cm, preferably of more than 1 cN cm, is required.

The measured values 11 and 12 are determined using a Schlenker flexural stiffness tester (produced by Messrs. Franck).

Surprisingly, it has been found that the adhesive tapes according to the invention, employing base material having the properties set out, can, without problems, be drawn from the roll and processed. The adhesive tapes according to the invention can easily be torn manually, and advantageously be cut by machine, at right angles to the web direction. The handle and rigidity of the base correspond to the properties known from the case of paper. Moreover, the base is insensitive to moisture.

Because of the special strength characteristics of the novel base, the adhesive tapes are especially suitable for the manufacture of carrier handles and reinforcements for these or for fixing strips of diaper pant closures. It is especially advantageous in this context that in particular narrow strip-shaped articles can be cut quickly and cleanly by machine from the web, at right angles to the web direction (namely to the machine running direction). The length of these strips is then equal to the width of the original web.

Moreover, because of its smooth, continuous surface, the base permits excellent printing with suitable printing inks. Prints which repeat in the machine direction and extend over the width can be applied particularly advantageously, and these then appear on the strip-shaped article (after cutting at right angles to the web direction) in precisely fitting length, running in the (new) lengthwise direction of the strip.

The adhesive can also be applied partially, for example in the form of strips, in the machine direction, with the strips running in the web direction. Viewed at right angles to the web direction, there is then a succession of adhesive-free and tacky zones. On the strip-shaped cut portions formed after cutting at right angles to the web direction, there then alternate adhesive-free and tacky zones, when viewed in the (new) lengthwise direction of the strip.

Such prints or partial coatings cannot be applied, or can only be applied with very expensive equipment, onto strip-shaped cut portions which have been produced from bases which have been stretched predominantly in the web direction.

The adhesive tapes according to the invention are also of excellent suitability for fluff pick-up rolls, since spent pieces of adhesive tape can effortlessly be torn off by hand. Perforations which facilitate tearing-off are not needed.

The invention also relates to the carrier handles and reinforcements for these, fixing strips for diaper pant closures and fluff pick-up rollers, as well as covering materials and release materials, obtainable with the base material according to the invention, and to the use of the bases for these purposes. Moreover, the invention also relates to the manufacture of the bases according to the invention and to the processes of manufacture of the abovementioned cut portions obtainable by transverse cutting, at right angles to the web direction.

Adhesive-free bases, optionally provided with a release lacquer, are moreover of excellent suitability for covering self-adhesive coatings, or for use as release interleaving. They can also be used as covering and insulating materials or packaging material. Accordingly, the invention also relates to the uncoated, foamed and stretched base material.

All quantities, proportions and percentage proportions are by weight.

The drawing shows, in cross-section, an embodiment of the adhesive tape according to the invention. The base 1 is coated with the adhesive composition 2.

The examples which follow serve to illustrate the invention.

In the examples, the release agent, adhesive and primer used had the following composition:

The release agent used was a commercial silicone release agent from the class of the condensation-crosslinking two-component systems. The crosslinking was catalysed with dibutyl-tin maleate. The release substance was applied as a 5% strength solution in toluene, using a doctor blade. The (dry) coating weight was 0.2 g/m$^2$. The adhesive consisted of 42 parts by weight of a styrene/isoprene block copolymer (SIS), 20 parts by weight of a pentaerythritol ester of hydrogenated rosin, 37 parts by weight of aliphatic hydrocarbon resin, softening point 85° C. and 1 part by weight of zinc dibutyl dithio-carbamate.

The adhesive was applied as a 40% strength solution in toluene, with subsequent drying. The amount of adhesive applied was 30–35 g/m$^2$. The adhesive can also be applied from a melt.

It was possible to dispense with the use of a special adhesion-promoting layer between the base and the adhesive. Of course, the polypropylene primers corresponding to the state of the art can be employed.

EXAMPLE 1

75 parts by weight of granular PP/PE block copolymer (melt index 230/2.16:5 g/10 min), 5 parts by weight of low density polyethylene having a melt index 190/5 of 2-5 g/10 min, 5 parts by weight of ethylene/vinyl acet-ate copolymer (EVA, as defined below), and 15 parts by weight of styrene/butadiene block copolymer (SBR, as defined below) are mixed well. To achieve this, it is advantageous to premix the three last-mentioned components with a small amount of the first component in a mixing extruder, and then granulate them. The resulting granules are mixed with the remaining PP/PE granules and with 1.5 parts by weight of the blowing agent, based on citric acid/sodium bicarbonate (Hydrocerol). This mixture is extruded, as a foamed web of about 1,000 μm, from a conventional extruder onto a cooling roll.

This foam web is stretched on a roll stretching unit in a stretch ratio of 1:2 in the web direction at temperatures between 110° C. and 155° C. The thickness of the stretched web is about 550 μm.

The material web is then fed to a stenter frame and stretched in a ratio of 1:6 at right angles to the web direction, at temperatures of 135° C.-160° C. The thickness of the base is about 90-110 μm. Its density is about 0.5 g/cm³.

The foamed uncoated bases thus obtained can be used as insulating material or packaging material. Desired lengths can easily be torn off.

To produce adhesive tapes, the base is edge-trimmed and then brought to a wetting tension of 40 mN/m on both sides by corona pretreatment. The base is then coated on one face with the adhesive composition mentioned above, is provided with the release agent on the rear face and is wound up into a roll from which adhesive tape rolls of lesser width are cut.

EXAMPLES 2 to 8

The adhesive tapes according to the invention indicated in Table 1 below are produced analogously to Example 1 (using 1.5 parts by weight of Hydrocerol).

The components mentioned in the examples have the following specific meaning:

PP: A PP homopolymer having a melt index 230/2.16 of about 5 g/10 min.

PP/PE: A PP/PE copolymer (random or block copolymer) having a melt index 230/2.16 of about 5 g/10 min. and an ethylene content of about 4%.

PE: A low density polyethylene having a melt index 190/5 of about 2-5 g/10 min.

PIB: A polyisobutylene having a mean molecular weight of 100,000.

EVA: An ethylene/vinyl acetate copolymer having a vinyl acetate content of 45%.

SBR: A styrene/butadiene block copolymer having a styrene content of 50% and a melt index 230/2.16 of about 5-10 g/10 min.

EPM: An ethylene/propylene polymer having an ethylene content of 50%, and a melt index 230/5 of about 5-10 g/10 min.

EPDM: An ethylene/propylene/diene terpolymer having an ethylene content of 50% and a melt index of about 5-10 g/10 min.

TABLE 1

| Example No. | PP | PP/PE | PE | EPDM | PIB | EVA | SBR | Stretch ratio in the web direction | Stretch ratio at right angles to the web direction |
|---|---|---|---|---|---|---|---|---|---|
| 2 | 96 | | 4 | | | | | 1:2 | 1:4 |
| 3 | 40 | 45 | 15 | | | | | 1:2 | 1:5 |
| 4 | | 70 | 5 | 15 | 5 | 5 | | 1:2.5 | 1:6 |
| 5 | | 70 | 10 | | | 5 | 15 | 1:2.5 | 1:6,5 |
| 6 | | 75 | 5 | | | 5 | 15 | 1:3.5 | 1:5 |
| 7 | | 75 | 10 | | | 5 | 10 | 1:2 | 1:6 |
| 8 | | 90 | 5 | | | | 5 | 1:2 | 1:4.5 |

In Example 4, EPM was also used in place of EPDM, with the same result.
In Table 2 which follows, the properties of the adhesive tapes according to the invention are shown.

| Example No. | | 1 | 2 | 3 | 4 | 5 | 6 | 7 | 8 |
|---|---|---|---|---|---|---|---|---|---|
| Thickness | (μm) | 110 | 110 | 110 | 110 | 110 | 90 | 150 | 110 |
| Density | (g/cm³) | 0.50 | 0.50 | 0.50 | 0.50 | 0.50 | 0.48 | 0.52 | 0.50 |
| Tensile strength | (N/mm²) | | | | | | | | |
| in the web direction | | 11 | 12 | 10 | 12 | 16 | 18 | 15 | 11 |
| at right angles to the web direction | | 50 | 45 | 50 | 50 | 60 | 33 | 55 | 50 |
| Elongation at break | (%) | | | | | | | | |
| in the web direction | | 45 | 50 | 45 | 45 | 50 | 60 | 50 | 45 |
| at right angles to the web direction | | 15 | 20 | 15 | 15 | 20 | 15 | 15 | 20 |
| Tensile impact strength | (mJ/mm²) | | | | | | | | |
| in the web direction | | 55 | 80 | 60 | 55 | 70 | 100 | 60 | 80 |
| at right angles to the web direction | | 175 | 110 | 150 | 150 | 200 | 100 | 180 | 140 |
| Tear propagation resistance | (N/mm) | | | | | | | | |
| tear travel in the web direction | | 55 | 30 | 40 | 50 | 60 | 35 | 60 | 40 |
| tear travel at right angles to the web direction | | 15 | 18 | 20 | 20 | 20 | 25 | 18 | 20 |

The measurements were carried out in accordance with the abovementioned methods specified in the description.

EXAMPLE 9

Fixing strips for diaper pant closures are produced from the base web provided over its entire surface with pressure-sensitive adhesive composition, and coated on its rear face. To produce these strips, rolls of 5 cm width are cut in the web direction. The 5 cm wide web of the roll is fed to a transverse cutting device which employs a 2.5 cm advance and cuts the strips (5×2.5 cm) at right angles to the web direction. The strips thus obtained have the strength properties mentioned above in their lengthwise direction, which corresponds to the direction at right angles to the web direction of the original web.

EXAMPLE 10

Adherable carrier handles are produced from a web provided with pressure-sensitive adhesive composition in strips in the web direction and correspondingly with a rear face coating in strips. To do this, coating is applied to the web in strips, in such a way that after cutting in the web direction tapes are formed which carry a strip of adhesive only at the side edges, with the middle zone remaining free, the width of the tape being 50 cm and the tacky zones at the sides each being 7 cm wide. The 50 cm wide web is fed to a transverse-cutting device which employs a 2.5 cm advance and cuts off the strips (50×2.5 cm) at right angles to the web direction. The strips thus obtained have the abovementioned strength properties in their lengthwise direction, which corresponds to the direction at right angles to the web direction of the original web. At both ends, the strips (carrier handles) have a 7 cm wide adhesive coating and can be adhered to an article. The middle, intended for gripping, is free from adhesive.

EXAMPLE 11

To produce fluff pick-up rolls with which fluff pick-up rollers or garment rollers can be obtained, a web provided over its entire surface with pressure-sensitive adhesive composition, and coated on the rear face, is cut in the web direction into 10 cm wide tapes of 2 m length. These tapes are wound on a cardboard core to form rolls, such that the coating of adhesive composition is on the outside. The non-tacky rear face is adhered to the cardboard core by means of a strip of double-sided adhesive tape obtained using the base according to the invention.

For packaging purposes or insulations, uncoated bases according to the invention, in accordance with Examples 2, 3 and 6, are preferred, while for release materials and covering materials, coated on one or both faces with a non-stick coating, bases of Example 6 are preferred.

Fixing strips for diaper pant closures and carrier handles or reinforcements for carrier handles are preferably obtained from adhesive tapes of Examples 1, 5 and 7.

We claim:

1. Adhesive tape having a base material which is stretched more highly at right angles to the web direction than in the web direction, contains polypropylene as the main component, and is provided with at least one pressure-sensitive or heat-sealable adhesive layer, characterised in that the base material is foamed and that the stretch ratio in the web direction is 1:1 to 1:4 and at right angles to the web direction is 1:3 to 1:8, the stretch ratio at right angles to the web direction being greater than the stretch ratio in the web direction.

2. Adhesive tape according to claim 1, characterised in that the stretch ratio of the base in the web direction is 1:2–3 or at right angles to the web direction is 1:4–6.

3. Adhesive tape according to claim 1, characterised in that the base contains polypropylene or polypropylene copolymers.

4. Adhesive tape according to claim 1, characterised in that the base contains a member selected from the group consisting of polyethylene, EPM, EPDM, polyisobutylene and a mixture thereof.

5. Adhesive tape according to claim 1, characterised in that the base contains a toughening additive.

6. Use of the adhesive tape according to claim 1 as a fluff pick-up roll.

7. Carrier handle according to claim 1, consisting of a cut portion of the adhesive tape according to claim 1.

8. Reinforcement for carrier handles according to claim 1, consisting of a cut portion of the adhesive tape according to claim 1.

9. Fixing strip according to claim 1, consisting of a cut portion of the adhesive tape according to claim 1.

10. Fixing strip for diaper pant closures according to claim 1, consisting of a cut portion of the adhesive tape according to claim 1.

11. Base according to claim 1, characterised in that it is provided with a release coating.

12. Base according to claim 1, characterised in that it is uncoated.

* * * * *